(12) United States Patent
Landis

(10) Patent No.: US 6,260,437 B1
(45) Date of Patent: Jul. 17, 2001

(54) STEERING WHEEL ATTACHMENT

(75) Inventor: Paul Marion Landis, Englewood, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/288,840

(22) Filed: Apr. 8, 1999

(51) Int. Cl.$^7$ ................................ G05G 1/10; F16B 2/14
(52) U.S. Cl. ................ 74/552; 403/256; 403/359.5; 403/374.3
(58) Field of Search ................... 74/552; 403/259, 403/261, 359, 370, 365, 378, 379.4, 247, 359.5, 256

(56) References Cited

U.S. PATENT DOCUMENTS

| | | | |
|---|---|---|---|
| 5,536,106 | * | 7/1996 | Landis et al. .................. 403/374 |
| 5,816,112 | * | 10/1998 | Hosoi et al. ................... 74/552 |
| 5,878,629 | * | 3/1999 | Nagata et al. .................. 74/552 |
| 5,921,147 | * | 7/1999 | Nagata et al. ................ 403/359 X |
| 6,033,145 | * | 3/2000 | Xu et al. ..................... 74/552 X |

FOREIGN PATENT DOCUMENTS

| | | |
|---|---|---|
| 9407807 | 7/1994 | (DE) . |
| 19616234 | 10/1997 | (DE) . |
| 0769440 | 4/1997 | (EP) . |
| 2608232 | * 6/1988 | (FR) ........................... 74/552 |
| 2724359 | 3/1996 | (FR) . |

\* cited by examiner

*Primary Examiner*—Vinh T. Luong
(74) *Attorney, Agent, or Firm*—Kathryn A. Marra

(57) ABSTRACT

A steering wheel attachment assembly and a method of assembling the steering wheel attachment to a steering wheel shaft is presented. More particularly, a back mounting plate for attachment to a steering wheel module. The back mounting plate includes a through which extends from a first side of the back mounting plate to a center opening. Integrally formed within the back mounting plate is a hub which is disposed in the center opening. The hub includes an opening formed in the center thereof which receives one end of the steering wheel shaft. The hub further includes a side bore and trough combination permit an assembler to gain access to the steering shaft disposed within the hub opening. The steering wheel shaft is securely but removably coupled to the back mounting plate by an interface lock and a taper lock with the hub. To lock the steering wheel shaft in place within the hub, a fastener is threaded through the side bore and engages the steering wheel shaft resulting in the shaft being driven into the taper lock.

22 Claims, 6 Drawing Sheets

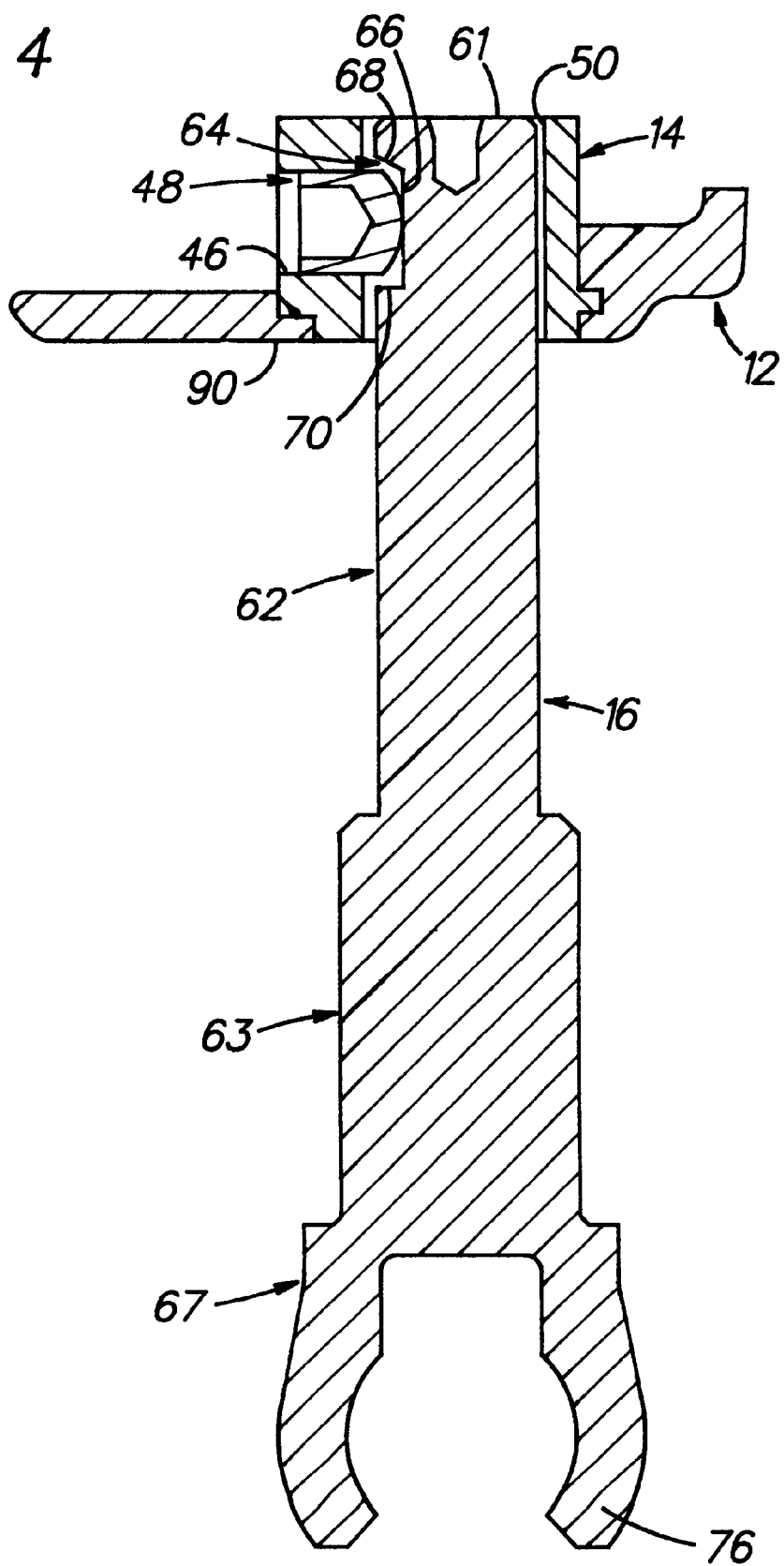

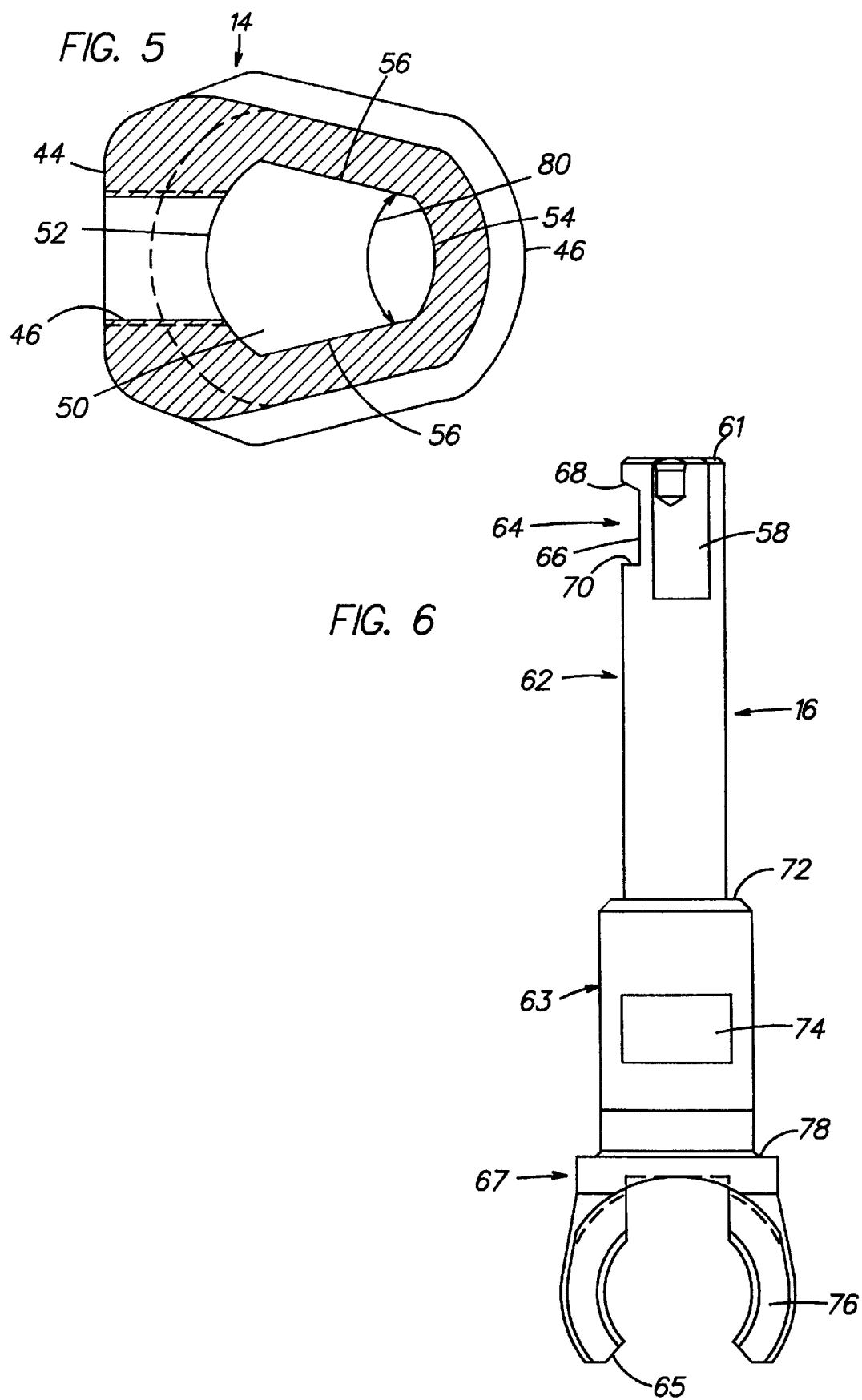

STEERING WHEEL ATTACHMENT

TECHNICAL FIELD

The present invention relates generally to a steering wheel component for a motor vehicle and more particularly, to a back mounting plate assembly for use in mounting a steering wheel to a steering wheel shaft via a side fastener column attachment.

BACKGROUND OF THE INVENTION

One assembly in a passenger vehicle is a steering wheel assembly which permits a driver to accurately steer the vehicle. Typically, the steering wheel assembly includes an upper assembly comprising a steering wheel hub mounted to a steering shaft which is enclosed in a steering wheel column. In the past, the steering wheel hub has been attached to the steering wheel shaft in a variety of ways and in most typical procedures, a fastener is used to mount the two components to one another. For example, the steering wheel hub may include a rear mounting plate having opposing sides in which an upper end of the steering wheel shaft is received at a first side. The upper end of the steering wheel shaft comprises a threaded portion which is attached to the rear mounting plate by fastening, e.g., bolting, the upper end to the rear mounting plate. This is usually done by threading a nut at a second side of the rear mounting plate to attach the two components to one another.

Most passenger vehicles have a driver's side air bag mounted to the steering wheel. The air bag assembly includes an air bag module that is disposed within the steering wheel assembly. The air bag module includes a mating connector which mates with a corresponding connector disposed at the rear mounting plate when the two are assembled. After attaching the rear mounting plate to the steering wheel shaft, the air bag module typically attaches to and mates with the second side of the rear mounting plate. The air bag module is secured to the rear mounting plate of the steering wheel by a plurality of fasteners.

During the attachment of the steering wheel hub to the steering wheel, access to the second side of the rear mounting plate is necessary so that the assembler may attach the upper end of the steering wheel shaft to the rear mounting plate by threading a bolt around the upper end of the steering wheel shaft. In another embodiment, the steering wheel assembly and the air bag assembly are partially combined and the steering wheel assembly comprises a steering wheel hub including a front mounting plate, wherein the air bag module is disposed within the steering wheel hub adjacent one side of the front mounting plate. A first connector extends from the front mounting plate and mates with a connector provided on a rear mounting plate. The rear mounting plate is attached to the upper end of the steering wheel shaft with a fastener. Next, the front and rear mounting plates mate with another and are mounted to one another via a plurality of fasteners. In this second embodiment and similar to the first steering wheel assembly, complete access to the rear mounting plate is necessary so that the assembler may receive the steering shaft on one side of the rear mounting plate and fasten the two together at a second side.

Because the steering wheel assembly typically comprises at least two components and the front and rear mounting plates are separated and not attached to one another until after the rear mounting plate is attached to the steering shaft, the overall assembly process is multi-component based which increases the time and cost to assemble the steering wheel assembly to the steering shaft.

SUMMARY OF THE INVENTION

The present invention comprises a steering wheel attachment assembly and a method of removably coupling the steering wheel attachment to a steering wheel shaft in a cost effective and convenient manner. More particularly, in one aspect the present invention is directed to a back mounting plate for attachment to a steering wheel module. Accordingly, the present steering wheel attachment assembly permits a steering wheel module to be supplied to the assembler in a fully assembled state prior to coupling the steering wheel module to the steering wheel shaft. In an exemplary embodiment, the back mounting plate includes lateral portions which define a mounting platform. The mounting platform preferably has a plurality of openings to receive fasteners for attaching the back mounting plate to a front mounting plate which is typically one component of the steering wheel module. The back mounting plate preferably has a recessed center portion intermediate the lateral portions with the recessed center portion including a base platform having a center opening formed therein. Formed within the base platform is a trough which extends from a first side of the back mounting plate to the center opening.

Integrally formed within the back mounting plate is a hub which is disposed in the center opening formed in the base platform. Preferably, the hub is similarly shaped as the center opening so that a complementary fit results between the two members. The hub includes an opening formed in the center thereof, wherein the hub opening is axially aligned with the center opening resulting in access to the hub opening from exterior the back mounting plate when the hub is disposed within the back mounting plate. The hub opening receives one end of the steering wheel shaft. The hub further includes a side bore longitudinally extending from one end of the hub to the hub opening and the side bore is axially aligned with the trough formed in the base platform. The side bore and trough combination permit an assembler to gain access to the hub opening formed in the hub and more specifically, to the steering wheel shaft which is disposed therein during the assembly process.

Preferably, the hub opening formed in the hub is tapered at one end and is defined by a pair of opposing arcuate walls and by a pair of flats which extend between the opposing arcuate walls. The flats comprise planar surfaces which seat against complementary flats formed in the steering wheel shaft to prevent the steering wheel shaft from freely rotating within the hub opening under an application of torque to the steering wheel shaft. Because of the complementary nature between both pairs of flats, the flats also serve to locate the steering wheel shaft during insertion into the hub opening.

In accordance with the present invention, the steering wheel shaft is easily and removably coupled to the back mounting plate by first inserting the one end of the steering wheel shaft into the hub opening using the flats as guides. The steering wheel shaft also includes a recessed slot intermediate the pair of flats formed therein, wherein the recessed slot has a planar back surface. The recessed slot is formed relative to the pair of flats so that when the steering wheel shaft is inserted into the hub opening, the side bore opens into the recessed slot. To securely and removably couple the steering wheel shaft to the hub, the fastener is guided by the trough into the side bore and engages the planar back surface of the recessed slot. As the application of torque to the fastener continues and the fastener is driven into the recessed slot, the steering wheel shaft is itself driven toward the arcuate wall of the hub opposite the side bore. The driving of the fastener into the recessed slot results in an interference locking of the steeling wheel shaft within the hub. This interference locking action prevents the steering wheel shaft from being displaced in a direction away from the hub under an application of force. Furthermore, a taper lock results when the steering wheel shaft is driven into a wedge portion of the hub. This taper lock results in the steering wheel shaft being securely coupled to the back mounting plate.

BRIEF DESCRIPTION OF THE DRAWINGS

Referring now to the drawings wherein like elements are numbered alike in the several Figures:

FIG. 4 is a cross sectional view taken along the line 4—4 in FIG. 3;

FIG. 5 is a cross sectional view taken along the line 5—5 in FIG. 1;

FIG. 6 is a front elevation view of the exemplary steering wheel shaft of FIG. 1.

DETAILED DESCRIPTION OF THE PREFERRED EMBODIMENT

Figure 1:
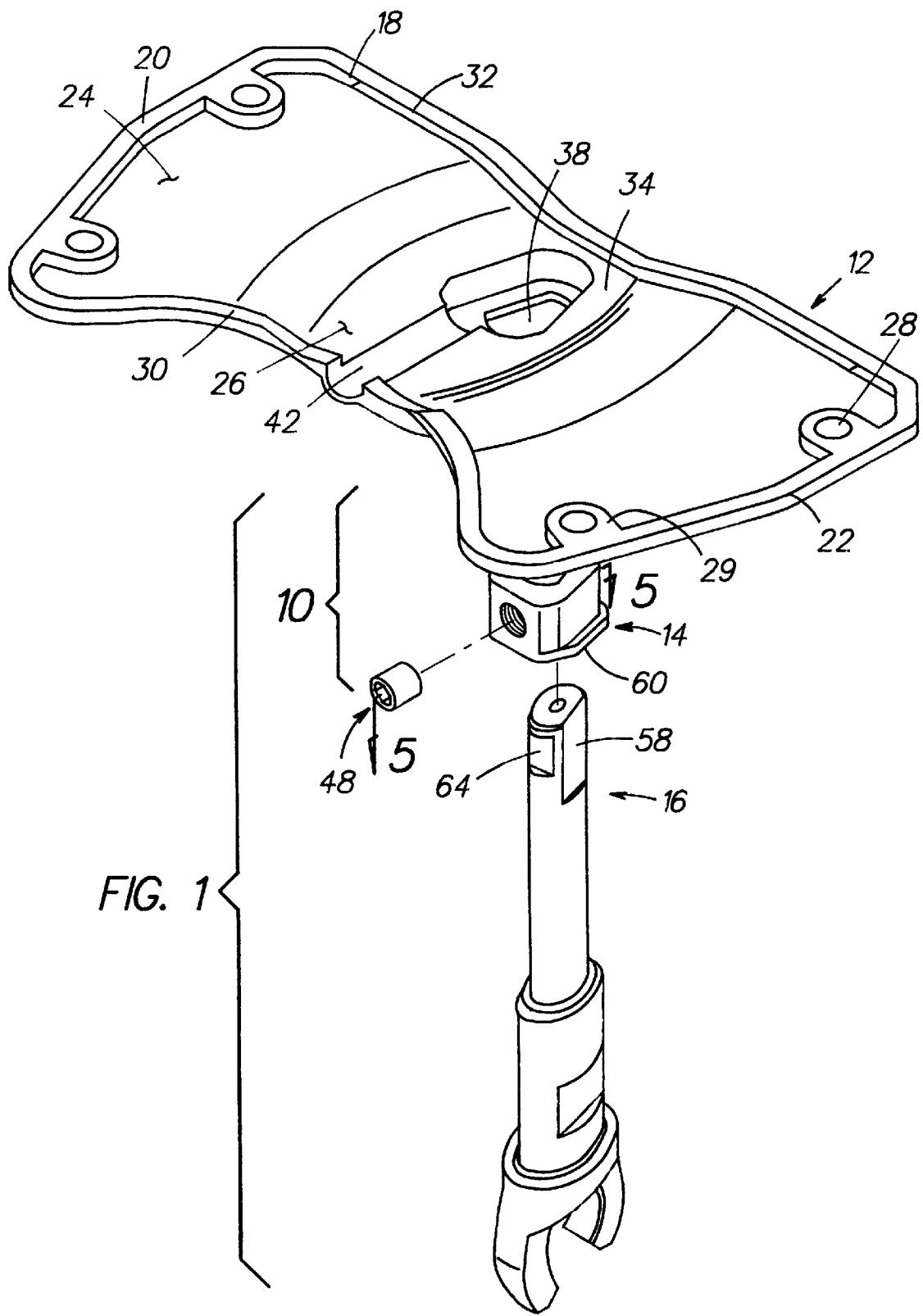
FIG. 1 is an exploded perspective view of a steering wheel attachment coupled to a steering wheel shaft embodying the present invention.

Referring to FIGS. 1–4, an exemplary embodiment of a steering wheel attachment assembly according to the present invention is generally designated by reference numeral 10. Steering wheel attachment assembly 10 includes a back mounting plate 12 and a hub 14 coupled to back mounting plate 12 as described in greater detail hereinafter. Also illustrated in FIG. 1 is a steering wheel shaft 16 to which steering wheel attachment assembly 10 is removably coupled.

Figure 2:
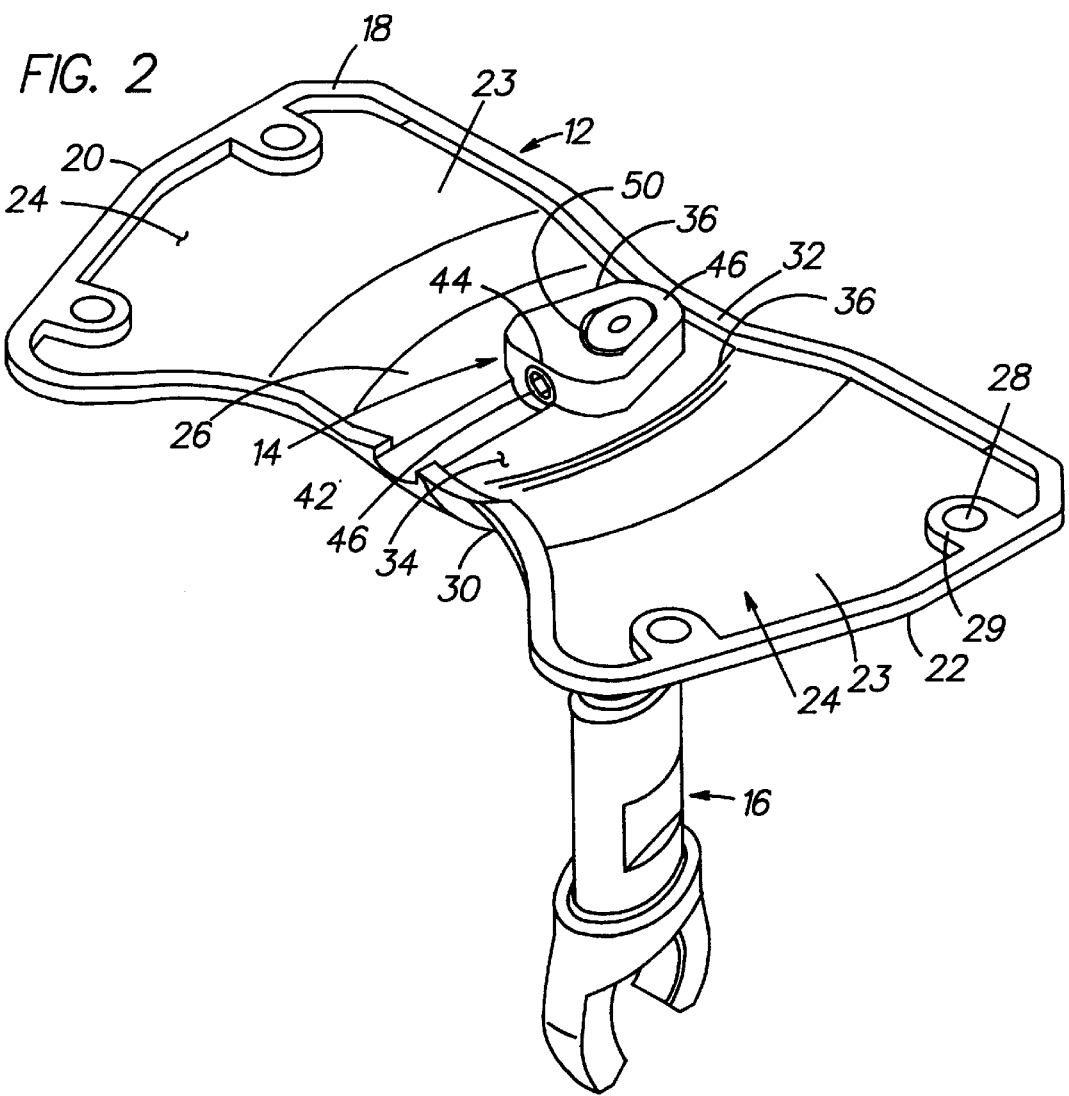
FIG. 2 is a perspective view of the steering wheel attachment and steering wheel shaft of FIG. 1 in an assembled state.
Figure 3:
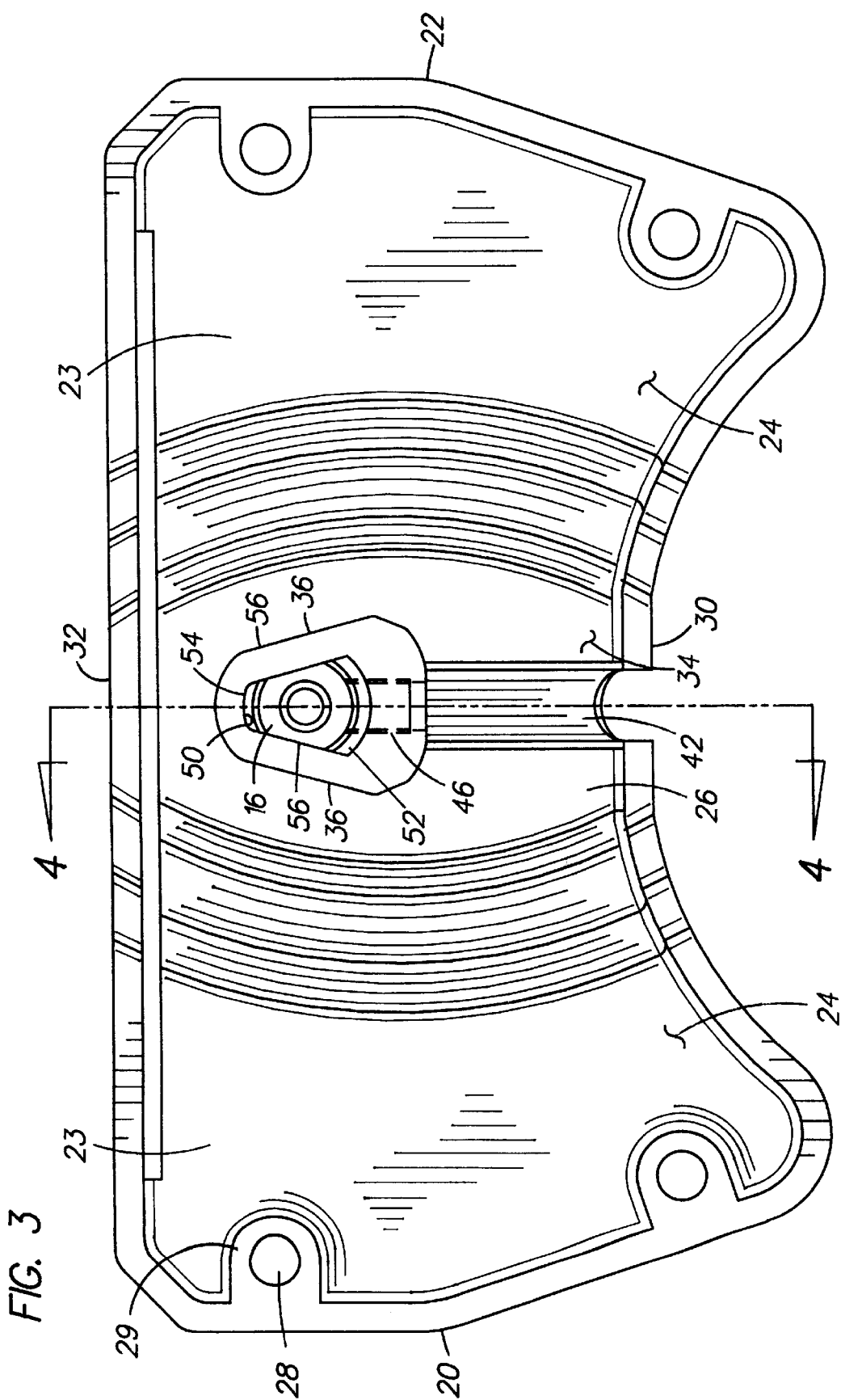
FIG. 3 is a top plan view of the steering wheel attachment and steering shaft of FIG. 2.

Referring to FIGS. 2–3, back mounting plate 12 comprises a casting plate having a perimetric rim 18 extending substantially around the entire periphery of back mounting plate 12. Back mounting plate 12 has a first end 20 and an opposing second end 22. Lateral portions 23 of back mounting plate 12 define a mounting platform 24 which extends from a recessed central portion 26 of back mounting plate 12 to first and second ends 20 and 22, respectively. It being understood that the lateral portions define mounting platform 24 lie within a single first plane. Formed within mounting platform 24 are a plurality of openings 28 intended to receive a fastener for attachment of steering wheel attachment assembly 10 to a complementary front mounting plate (not shown) of a steering wheel 100 (shown in FIG. 7). Preferably, mounting platform 24 includes foul-openings 28 with two being located at first end 20 and two being located at second end 22. As illustrated in FIG. 1, each of openings 28 may be provided on an island 29 which extends inward from first and second ends 20 and 22, respectively, toward the center of back mounting plate 12.

As shown in more detail in FIGS. 1–3, back mounting plate 12 has a first side wall 30 and an opposing second side wall 32 both of which are defined by perimetric rim 18. Intermediate first end 20 and second end 22 is recessed central portion 26 which includes a planar base platform 34 recessed in relation to mounting platform 24. Base platform 34 lies within a second plane which is substantially parallel to the first plane defining mounting platform 24. In an exemplary embodiment shown best in FIGS. 2 and 3, base platform 34 is partially defined by opposing arcuate walls 36. Referring to FIGS. 1–3, base platform 34 includes an aperture 38 which is designed to receive hub 14 when back mounting bracket 12 and hub 14 are attached to one another. Aperture 38 is slightly tapered toward second side wall 32 of back mounting plate 12 and is similarly shaped as hub 14 so that a complimentary fit between hub 14 and back mounting plate 12 results when the two components are coupled together.

First side wall 30 is arcuate in shape and extends inwardly toward hub 14. Central to both first side wall 30 and base platform 34 is a trough 42 which is formed in back mounting plate 12, more specifically in base platform 34. Trough 42 extends inward from first side wall 30 to one end of aperture 38. At first side wall 30 where trough 42 is formed, perimetric rim 18 is eliminated so that complete access to trough 42 is permitted.

Figure 7:
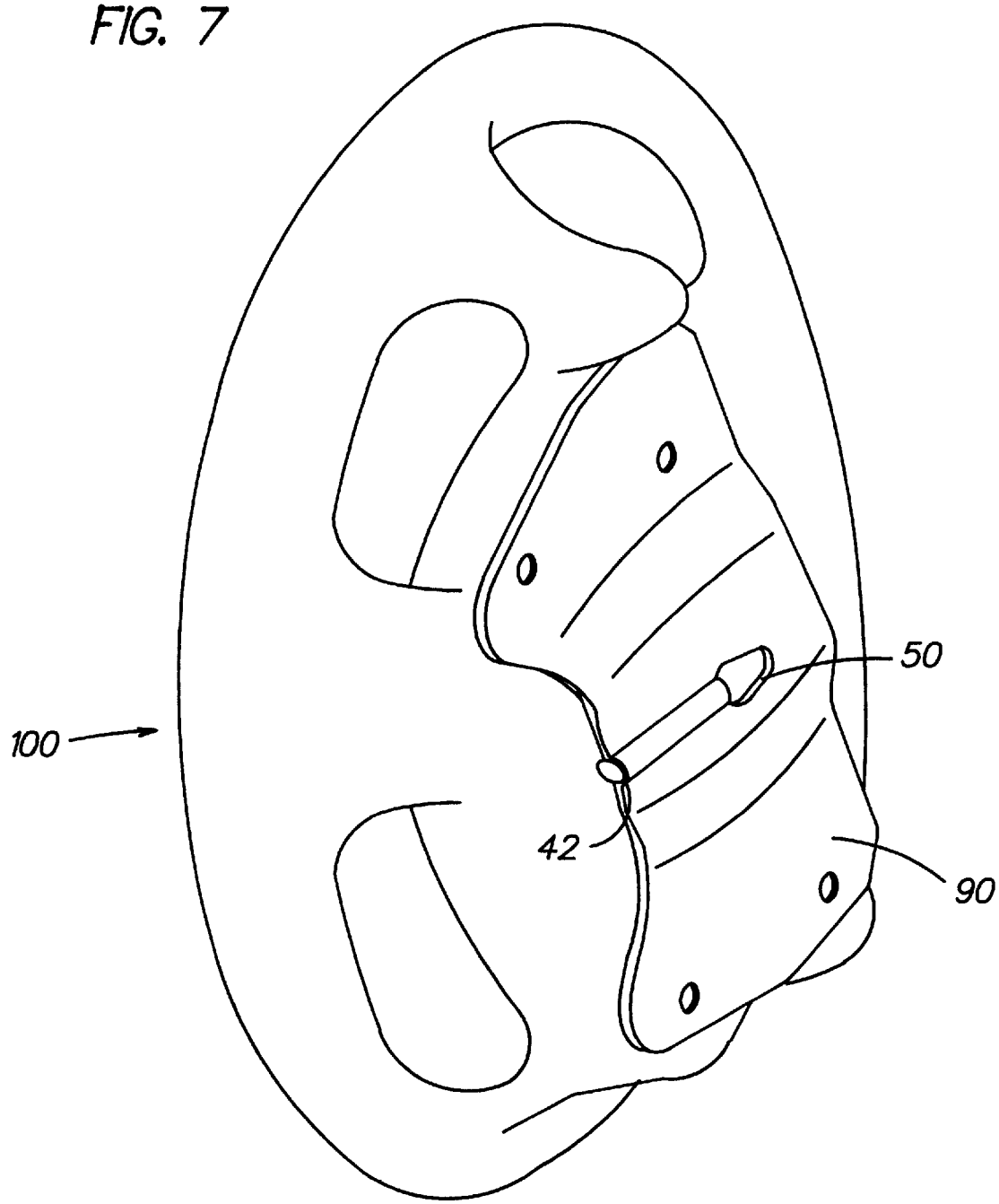
FIG. 7 is a perspective view of a steering wheel having the steering wheel attachment of FIG. 1 attached thereto.

As best shown in FIG. 2, when hub 14 is coupled to back mounting plate 12, a secure fit results because of the complementary nature of the two members. Due to hub 14 being similarly shaped as aperture 38, outer surfaces of hub 14 seat flush against inner surfaces of back mounting plate 12 with the inner surfaces defining aperture 38. Referring to FIGS. 1 and 2, hub 14 includes a first end 44 and an opposing second end 46. At first end 44 is a side bore (through bore) 46 which is sized to receive a fastener 48, e.g., drive screw. When hub 14 is disposed within aperture 38, side bore 46 is aligned with trough 42 so that an assembler may insert fastener 48 into side bore 46 using trough 42 as a guide. It being understood that trough 42 permits complete access to side bore 46 when back mounting plate 12 is attached to steering wheel 100 (FIG. 7).

Referring to FIGS. 1 and 5, hub 14 also includes an opening 50 which receives drive shaft 16, wherein opening 50 is generally perpendicular to side bore 46. It being understood that side bore 46 is tapped into hub 14 and extends and opens into opening 50. Opening 50 is defined by a pair of opposing first and second arcuate walls 52 and 54 with second arcuate wall 54 being proximate second side wall 32 of back mounting plate 12 and first arcuate wall 52 being proximate one end of trough 42 formed in base platform 34. One end of side bore 46 is formed in first arcuate wall 52 so that when fastener 48 is inserted into side bore 46 it can extend into opening 50. Opening 50 is also defined by a pair of flats 56 which extend between first and second arcuate walls 52 and 54.

Second arcuate wall 54 preferably has a length less than first arcuate wall 52 so that flats 56 extending between first and second arcuate walls 52 and 54 are tapered toward second arcuate wall 54. Flats 56 comprise planar surfaces which seat against complementary flats 58 formed in steering wheel shaft 16 to prevent steering wheel shaft 16 from freely rotating within opening 50 under an application of torque to steering wheel shaft 16. Hub 14 further includes a perimetric lip 60 which extends from a lower portion of the outer surfaces of hub 14. As best shown in FIG. 4, perimetric lip 60 is disposed and secured within back mounting plate 12 by a casting process or the like as will be described hereinafter in greater detail.

Referring now to FIGS. 3, 4, and 6, which illustrate an exemplary embodiment of steering wheel shaft 16 used in combination with and attached to steering wheel attachment assembly 10 of the present invention. Steering wheel shaft 16 generally is formed of three sections, namely a first section 62, a second section 63, and a third section 67. Steeling wheel shaft 16 has a first end 61 and an opposing second end 65. In accordance with the present invention, first end 61 is received within opening 50 of hub 14 when steering wheel shaft 16 is removably coupled to steering wheel attachment assembly 10. Formed in steering wheel shaft 16 at first end 61 are the pair of flats 58. Flats 58 comprise planar surfaces which are recessed from the outer surface of first section 62 of steering wheel shaft 16 which generally comprises a circular member. Preferably, flats 58 have a length which is less than the a length of flats 56 so that when steering wheel shaft 16 is disposed within hub 14, flats 58 provide a stop for hub 14 and accordingly properly locate hub 14 relative to steering wheel shaft 16.

First section 62 also includes a recessed slot 64 formed in the outer surfaces of steering wheel shaft 16 at first end 11. Recessed slot 64 includes a planar back surface 66, a beveled top edge 68 and a stepped bottom edge 70 both of which intersect planar back surface 66. Recessed slot 64 is disposed intermediate flats 58 with stepped bottom edge 70 being generally perpendicular to the planar surface of flats 58. Beveled top edge 68 helps to locate fastener 48 so that it engaged planar back surface 66 for the beveled nature helps ride fastener 48 to planar back surface 66. The width of planar back surface 66 is greater than the width of fastener 48 so that fastener 48 easily engages planar back surface 66.

Second section 63 of steering wheel shaft 16 also preferably comprises a generally circular member having a diameter greater than the diameter of first section 62. At the point of intersection between first section 62 and second section 63, an annular shoulder 72 is Formed. Formed within second section 63 is a slot 74 which extends generally horizontal. Third section 67 includes a yolk 76 disposed at one end, wherein yolk 76 permits the attachment of third section 67 of steering wheel shaft 16 to an additional steering component. At the point of intersection between the second section 63 and third section 67, an annular shoulder 78 is formed. In the exemplary embodiment shown, third section 67 has a diameter greater than the diameter of second section 63. Steering wheel shaft 16 is formed of any suitable material and preferably is formed of steel. It being understood that steering wheel shaft 16 is merely exemplary in nature and it is within the scope of the present invention that other shafts may be used with steering wheel attachment assembly 10.

Referring to FIGS. 1–4, back mounting plate 12 preferably comprises a suitable casting material, e.g., magnesium or aluminum, and is formed using known casting methods. More preferably, back mounting plate 12 is cast around hub 14 to form a unitary member which comprises steering wheel attachment assembly 10. Hub 14 may or may not comprise the same casting material used to form back mounting plate 12. Suitable casting procedures known in the art may be used to form steering wheel attachment assembly 10. In this embodiment, and as best shown in FIGS. 2 and 4, back mounting plate 12 is cast around and to hub 14 to form the single unitary piece. Hub 14 may be formed of a metal, e.g., steel, or any other suitable material.

Alternatively, a casting procedure using a single cast mold may be used to form the entire steering wheel attachment assembly 10 including back mounting plate 12 and hub 14. In this embodiment, back mounting plate 12 and hub 14 are formed of the same material. Side bore 46 is preferably formed by a tapping process after hub 14 and back mounting plate 14 are formed. Side bore 46 is tapped into hub 14 through first end 44 until side bore 46 opens into opening 50.

Referring again to FIGS. 1–4, after forming steering wheel attachment assembly 10, steering wheel shaft 16 is removably coupled thereto by disposing steering wheel shaft 16 within hub 14. Initially, steering wheel shaft 16 is inserted into opening 50 so that steering wheel shaft 16 is adjacent first arcuate wall 52. More specifically, first section 62 of steering wheel shaft 16 is inserted into opening 50 adjacent first arcuate wall 52 so that flats 58 formed in steering wheel shaft 16 complementarily seat against flats 56 formed internally in opening 50 of hub 14. This also serves to properly locate recessed slot 64 centrally in hub 14 resulting in side bore 46 formed in hub 14 being axially aligned with recessed slot 64. Because the planar surfaces of flats 56 and 58 seat against one another, steering wheel shaft 16 is prevented from freely rotating within opening 50 of hub 14 upon the application of torque to the steering wheel shaft 16. In other words, flats 56 and 58 act as a torque locking mechanism and secure steering wheel shaft 16 in place within opening 50 of hub 14.

Once first end 61 of first section 62 is inserted into opening 50 of hub 14, steering wheel attachment assembly 10 is removably coupled to steering wheel shaft 16 according to the present invention. As previously described, when back mounting plate 12 is attached to a front backing plate (not shown), access to side bore 46 of hub 14 is permitted due to the recessed nature of the central portion 26 of back mounting plate 12. The recessed central portion 26 is also designed to accommodate the height of hub 14 when back mounting plate 12 is attached to the front mounting plate to form assembled steering wheel 100 (FIG. 7) so that height of hub 14 does not extend into the first plane defined by mounting platform 24 and thus interfere and obstruct with the attachment of back mounting plate 12 to the front mounting plate. In addition, trough 42 permits the assembler to gain access to fastener 48 in side bore 46 so that a tool (not shown) may engage fastener 48 and thread fastener 48 within side bore 46 into engagement with steering wheel shaft 16.

FIGS. 4 and 5 best illustrate the locking mechanism of the present invention for removably locking steering wheel shaft 16 within hub 14 resulting in back mounting plate 12 being securely attached to steering wheel shaft 16. Fastener 48 is guided by trough 42 into side bore 46 formed in hub 14. Because recessed slot 64 is aligned with side bore 46 due to flats 56 and 58, fastener 48 is driven into and engages planar back surface 66 upon the application of torque to fasteners 48, wherein planar back surface 66 faces side bore 46. Recessed slot 64 is located central to hub 14 in an axial direction to prevent caulking of steering wheel shaft 16 within internal surfaces of hub 14 upon application of torque. In other words., by centrally locating recessed slot 64 relative to hub 14, a balancing force exists and fastener 48 may be driven into planar back surface 66.

Upon application of torque of fastener 48 resulting in fastener 48 engaging planar back surface 66, first section 62 of steering wheel shaft 16 is driven toward second arcuate wall 54 of hub 14. Because flats 58 of steering wheel shaft 16 seat flush against flats 56 of hub 14, rotational movement of steering wheel shaft 16 is prevented by this locking mechanism. In addition, as fastener 48 is driven toward second arcuate wall 54 of hub 14, a taper lock results between steering wheel shaft 16 and hub 14 due to steering wheel shaft 16 being driven into a wedge 80. Wedge 80 comprises an ate extending between flats 56 of hub 14 proximate second arcuate wall 54, As steering wheel shaft 16 is driven into wedge 80, it is frictionally locked in place through the application of torque to fastener 48.

The interaction between fastener 48 and recessed slot 64 and more specifically, the driving of fastener 48 into recessed slot 64 engage planar back surface 66 results in an interference locking of steering wheel shaft 16 within hub 14. This interference locking action prevent steering wheel shaft 16 from moving in both a downward direction away from hub 14 and an upward direction toward hub 14. Therefore, steering wheel shaft 16 is prevented from coming out of hub 14 under an application of force in the downward direction or being inserted too great into hub 14.

As best shown in FIG. 4, once steering wheel assembly 10 is formed, hub 14 does not extend into a plane defined by a lower surface 90 of back mounting plate 12. In other words, hub 14 does not extend below lower surface 90 of back mounting plate 12 when the two are attached together to from steering wheel assembly 10. This permits steering wheel assembly 10 to be attached to the front mounting plate of steering wheel 100 (FIG. 7). The lower surface of steering wheel 100 typically contacts and engages a steering column and in the present invention the lower surface of steering wheel 100 is defined by lower surface 90. Because of the generally planar aspect of lower surface 90, steering wheel 100 may be seated flush against another steering wheel component during assemble of the entire steering wheel assembly.

Now turning to FIG. 7 which illustrates steering wheel 100 having steering wheel attachment assembly 10 of the present invention attached thereto. As shown, lower surface 90 of back mounting plate 12 includes opening 50 which conveniently receives steering wheel shaft 16 (FIG. 1). Trough 42 is clearly visible and is located on one side of steering wheel 100. As previously discussed, the present invention permits the assembler to attach fully assembled steering wheel 100 directly to steering wheel shaft 16. Consequently, steering wheel 100 may be supplied to the assembler in the exemplary fully-assembled from illustrated in FIG. 7, wherein the rear mounting bracket is already attached directly to the remaining steering wheel components and the air bag module, if applicable, is also already disposed within steering wheel 100. Steering wheel 100 is easily and removably coupled to steering wheel shaft 16 by inserting steering wheel shaft 16 into opening 50 until steering wheel shaft 16 assumes its proper position. A tool (not shown) to drive fastener 48 (FIG. 1) is guided by trough 42 and inserted into side bore 46 until it engages fastener 48 and upon operation of the tool, fastener 48 engages recessed slot 64 (FIG. 6) of steering wheel shaft 16 resulting it being driven into a taper lock in a wedge 80 (FIG. 5). To disengage steering wheel shaft 16 from steering wheel attachment assembly 10, fastener 48 is removed from hub 14 and more specifically, the engagement between fastener 48 and recessed slot 64 is eliminated resulting in free movement of steering wheel shaft 16 in a direction away from back mounting plate 12 and hub 14.

One notable advantage of the present invention is that it eliminates the additional steps of having to first attach the rear mounting plate to the steering wheel shaft prior to then attaching the rear mounting plate to the rest of the steering wheel assembly, including the front mounting plate to which the rear mounting plate is conventionally directly attached. Steering wheel attachment assembly 10 and the method of attaching the same to steering wheel shaft 16 of the present invention thus permits a fully-assembled steering wheel 100 to be manufactured and assembled at one location and then delivered to a second assembly site where it is easily securely attached directly to steering wheel shaft 16 during the assembly of the upper steering wheel components. Consequently, the number of separate parts which are needed for the attachment of steering wheel 100 to steering wheel shaft 16 is reduced and the ease of assembly is likewise increased. Accordingly, a more cost effective and less time consuming process and steering wheel attachment assembly is present in accordance with present invention.

It will be understood that a person skilled in the art may made modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A steering wheel attachment assembly for attaching a steering wheel to a steering wheel shaft, comprising:
   a back mounting plate;
   a hub being secured to said back mounting plate, said hub having a central opening for receiving a portion of said steering wheel shaft;
   a through bore radially extending from said central opening; and
   a fastener disposed in said through bore for securing said portion of said steering wheel shaft to said hub, said fastener causing said portion of said steering wheel shaft to be secured in said central opening as said fastener is driven into said central opening, said portion of said steering wheel shaft and said fastener positioning in the same direction when said fastener causes said portion of said steering wheel shaft to be secured in said central opening.

2. The steering wheel attachment assembly as in claim 1, wherein the hub further includes a perimetric lip at one end, the perimetric lip being secured to the back mounting plate during a casting process in which the back mounting plate is cast about the hub.

3. The steering wheel assembly as in claim 1, wherein the back mounting plate further includes a trough extending from a first side wall of the back mounting plate to the through bore.

4. A steering wheel attachment as in claim 1, wherein said portion of said steering wheel shaft includes a receiving area, said receiving area engages said fastener as said fastener travels into said central opening.

5. A steering wheel assembly for attaching a steering wheel to a steering wheel shaft, comprising:
   a back mounting plate;
   a hub being secured to said back mounting plate, said hub having a central opening for receiving a portion of said steering wheel shaft;
   a through bore radially extending from said central opening;
   a fastener disposed in said through bore for securing said portion of said steering wheel shaft to said hub; and
   a trough extending from a first side wall of the back mounting plate to the through bore.

6. The steering wheel assembly as in claim 5, wherein the through bore is axially aligned with the trough.

7. The steering wheel attachment assembly as in claim 5, wherein the back mounting plate includes a center portion recessed relative to lateral portions of the back mounting plate.

8. The steering wheel attachment assembly as in claim 5, wherein the central opening is defined by a pair of opposing first and second walls and a pair of first planar surfaces which extend between the pair of opposing walls, said pair of first planar surfaces having an angular configuration with respect to each other.

9. The steering wheel attachment assembly as in claim 8, wherein the central opening tapers toward the second wall.

10. The steering wheel attachment assembly as in claim 9, wherein the through bore is located in the first wall opposite the tapered second wall.

11. The steering wheel attachment assembly as in claim 5, wherein the back mounting plate is casted about the hub to form a unitary component.

12. The steering wheel attachment assembly as in claim 5, wherein the hub is integrally formed with the back mounting plate as part of a casting process.

13. The steering wheel attachment assembly as in claim 5, wherein said portion of said steering wheel shaft further includes a recessed area for engaging a portion of said fastener as said fastener travels into said central opening.

14. The steering wheel attachment assembly as set forth in claim 13, wherein the recessed area is axially aligned with the through bore, said portion of the steering wheel shaft being removably coupled to the hub by threading the fastener within the through bore until the fastener engages a portion of the recessed area causing an interference lock between said portion of the steering wheel shaft and the hub.

15. A steering wheel attachment assembly as in claim 5, wherein said fastener is a screw having a grooved surface for meshingly engaging a grooved surface of said through bore.

16. A steering wheel attachment assembly for attaching a steering wheel to a steering wheel shaft, comprising:
    a back mounting plate;
    a hub being secured to said back mounting plate, said hub having a central opening for receiving a portion of said steering wheel shaft;
    a through bore radially extending from said central opening; and
    a fastener disposed in said through bore for securing said portion of said steering wheel shaft to said hub, said fastener causing said portion of said steering wheel shaft to be secured in said central opening as said fastener is driven into said central opening, said portion of said steering wheel shaft and said fastener traveling in the same direction when said fastener causes said portion of said steering wheel shaft to be secured in said central opening
    a perimetric rim disposed around an outer periphery of the back mounting plate, and a trough extending from said rim to said hub.

17. A steering wheel attachment assembly for attaching a steering wheel to a steering wheel shaft, comprising:
    a mounting plate;
    a hub being secured to said mounting plate, said hub having a central opening for receiving a portion of said steering wheel shaft, said central opening having a pair of planar surfaces having an angular configuration with respect to each other, said angular configuration causing said central opening to have a first dimension at a first wall of said central opening and a second dimension at a second wall of said central opening, said first dimension being larger than said second dimension, said portion of said steering wheel shaft is also configured to have a pair of planar surfaces with an angular configuration similar to the angular configuration of said pair of planar surfaces of said central opening, said pair of planar surfaces of said portion of said steering wheel shaft frictionally engage said pair of planar surfaces of said central opening as said portion of said steering wheel shaft moves from said first wall of said central opening to said second wall of said central opening;
    a through bore extending from said first side of said central opening;
    a fastener being received within said through bore, said fastener causing said portion of said steering wheel shaft to move from said first wall of said central opening to said second wall of said central opening.

18. A steering wheel attachment assembly for attaching a steering wheel to a steering wheel shaft, comprising:
    a mounting plate;
    a hub being secured to said mounting plate, said hub having a central opening for receiving a portion of said steering wheel shaft, said central opening having a pair of planar surfaces having an angular configuration with respect to each other, said angular configuration causing said central opening to have a first dimension at a first wall of said central opening and a second dimension at a second wall of said central opening, said first dimension being larger than said second dimension;
    a through bore extending from said first wall of said central opening;
    a fastener being received within said through bore, said fastener causing said portion of said steering wheel shaft to move from said first wall of said central opening to said second wall of said central opening; and
    a trough extending from said through bore to a perimeter portion of said mounting plate.

19. A steering wheel attachment assembly for attaching a steering wheel to a steering wheel shaft, comprising:
    a mounting plate having an upper surface and a lower surface, said upper surface being mounted to a steering wheel;
    a hub being secured to said mounting plate at a position inboard from the perimeter of said mounting plate, said hub having a central opening for receiving a portion of a steering wheel shaft;
    a through bore extending from a first wall of said central opening;
    a fastener for being received within said the through bore, said fastener providing a securing force for securing said portion of said steering wheel shaft to said hub; and
    a means for allowing the insertion of and manipulation of said fastener when said upper surface of said mounting plate is secured to a steering wheel, said means being a channel in said upper surface of said mounting plate.

20. A steeling wheel attachment assembly for attaching a steering wheel to a steering wheel shaft, comprising:
    a back mounting plate;
    a hub being secured to said back mounting plate, said hub having a central opening for receiving a portion of said steering wheel shaft, said central opening is defined by a pair of opposing first and second walls and a pair of first planar surfaces which extend between the pair of opposing walls, said pair of first planar surfaces having an angular configuration with respect to each other, said portion of said steering wheel shaft has an outer configuration smaller than said central opening, said portion of said steering wheel shaft also has a pair of opposing first and second walls and a pair of first planar surfaces which extend between the pair of opposing walls, said pair of first planar surfaces having an angular configuration with respect to each other;

a through bore radially extending from said central opening; and a fastener disposed in said through bore for securing said portion of said steering wheel shaft to said hub, said fastener causing said portion of said steering wheel shaft to be secured in said central opening as said fastener is driven into said central opening, said portion of said steering wheel shaft and said fastener traveling in the same direction when said fastener causes said portion of said steering wheel shaft to be secured in said central opening.

21. A steering wheel attachment assembly as in claim 20, wherein said portion of said steering wheel shaft tapers towards said second wall.

22. A steering wheel attachment assembly as in claim 21, wherein said portion of said steering wheel shaft includes a recessed area, said recessed area being axially aligned with said through bore when said portion of said steering wheel shaft is inserted into said central opening, said recessed area being configured to engage a portion of said fastener as said fastener travels into said central opening.

* * * * *